Jan. 20, 1959    E. C. YOKEL    2,869,701
OIL PRESSURE ACTUATED CLUTCH
Filed April 26, 1954    2 Sheets-Sheet 2
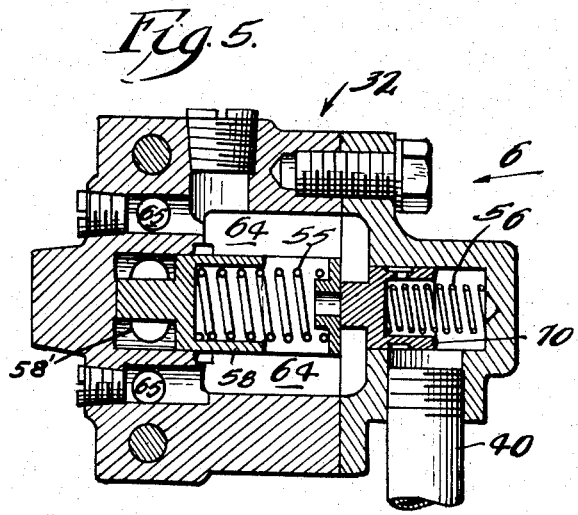
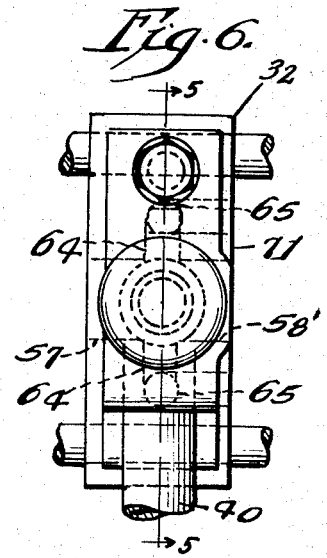
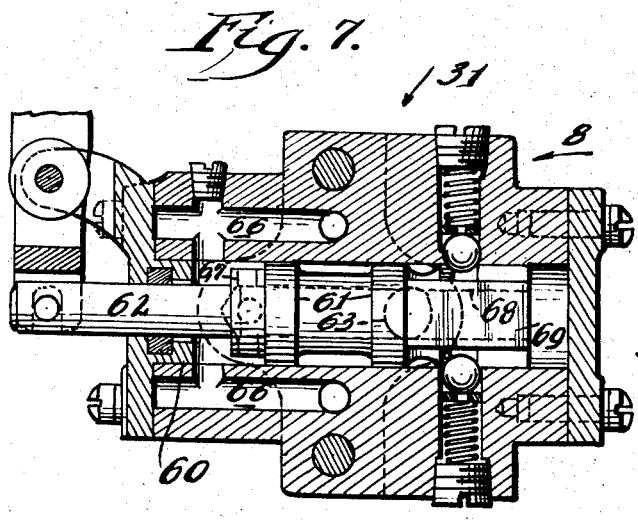
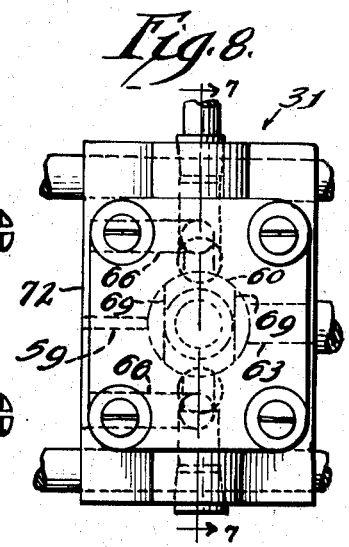
Inventor.
Edward C. Yokel.
By
Attorney.

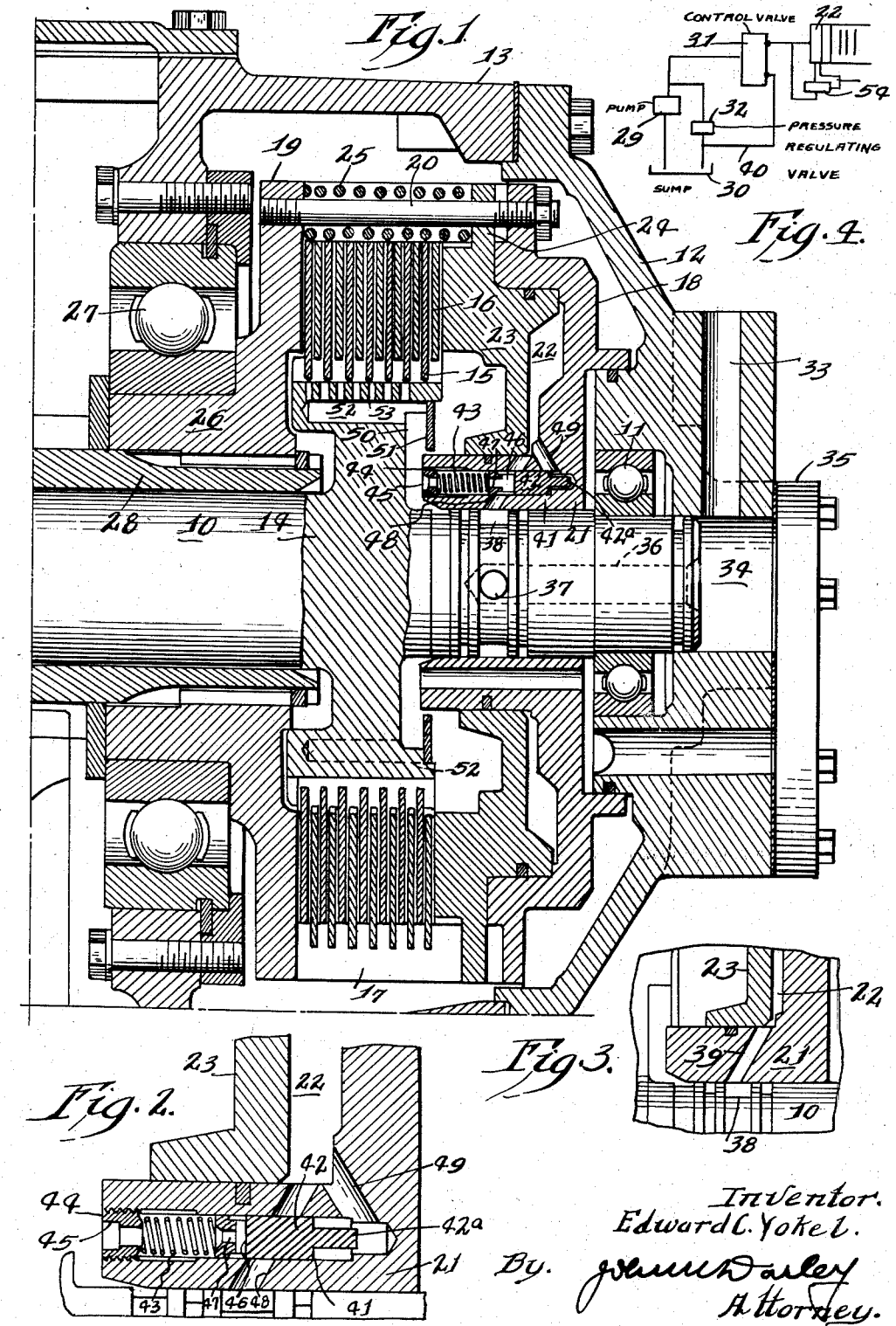

United States Patent Office 2,869,701
Patented Jan. 20, 1959

2,869,701

OIL PRESSURE ACTUATED CLUTCH

Edward C. Yokel, Racine, Wis., assignor to Twin Disc Clutch Company, Racine, Wis., a corporation of Wisconsin Application April 26, 1954, Serial No. 425,454

8 Claims. (Cl. 192—85)

My invention relates to hydraulically actuated clutches of the friction type and more particularly to an arrangement thereof in which provision is made for reducing shock when the plates are moved to engaging position.

Clutches of this general type are usually released by springs when the hydraulic pressure is cut off and when this operation is reversed, the build up of pressure in the clutch cylinder moves the clutch piston to compress the springs and engage the plates. The pressure rise is very rapid as the plates fully engage since the clearance between the plates has been taken up by the movement of the piston so the plates engage with a substantial shock which is transmitted through the connected mechanism. This action is particularly objectionable in some driver controlled vehicles, such as tractors, because of the jolt imparted to the driver. Attempts to solve this problem have usually included one or more accumulators in the hydraulic system including the clutch, but these devices embody their own disadvantages.

It is therefore one object of my invention to provide a hydraulically actuated, friction clutch employing oil as the pressure medium and in which a part of the oil is diverted to flow between the clutch plates when the clutch piston begins moving towards engaged position to thereby cool the plates and provide for a relatively soft and cushioned engagement of the plates due to the oil therebetween.

A further object is to provide a clutch of the type set forth in which the oil flow to the plates is interrupted just before full engagement.

A further object is to provide a clutch of the character indicated in which the diversion of oil to the plates is accomplished through the medium of a piston valve which is responsive to a predetermined pressure in the clutch cylinder to interrupt oil flow to the plates.

These and further objects of the invention will be set forth in the following specification, reference being had to the accompanying drawing, and the novel means by which said objects are effectuated will be definitely pointed out in the claims.

In the drawing:

Fig. 1 is a sectional elevation of an oil operated clutch embodying the invention, the clutch being shown in release position.

Fig. 2 is an enlarged, fragmentary, sectional elevation similar to Fig. 1 and showing the clutch piston in engaged position.

Fig. 3 is a fragmentary, sectional elevation as shown in Fig. 1, but taken along a different radius.

Fig. 4 is a schematic layout showing a typical hydraulic circuit for controlling operation of the clutch.

Fig. 5 is a sectional view of the pressure regulating valve as taken along the line 5—5 in Fig. 6, the valve being shown in non-regulating position.

Fig. 6 is an end view looking in the direction of the arrow 6 in Fig. 5.

Fig. 7 is a sectional elevation of the control valve for determining release and engagement of the clutch, the section being taken along the line 7—7 in Fig. 8 and the valve being shown in release position.

Fig. 8 is an end view of the control valve looking in the direction of the arrow 8 in Fig. 7.

Referring to Fig. 1, the numeral 10 designates an input shaft whose left end is appropriately journaled and connected in the usual way to a source of power, such as an engine, and whose right end is journaled in a bearing 11 carried by a cover plate 12 suitably bolted to a housing 13.

At a convenient distance from the bearing 11 and inwardly of the housing 13, the shaft 10 includes an annulus 14 whose periphery is suitably toothed for relative axial sliding and driving engagement with a first plurality of annular clutch plates 15 which are alternately related to a second plurality of annular clutch plates 16 whose peripheries have driving and sliding engagement with a plurality of circumferentially spaced, cantilever arms 17. The arms 17 extend between a back plate 18 and an abutment plate 19 with which the arms are integrally formed and this subassembly is secured together by a plurality of circumferentially spaced bolts 20. The back plate 18 includes a hub 21 that encircles the input shaft 10 between the bearing 11 and the annulus 14 and is otherwise suitably shaped on the clutch plate side to form an annular cylinder 22 whose inner circumferential surface is defined by the hub 21.

An annular piston 23 is slidable in the cylinder 22 in actuating relation to the clutch plates and its periphery includes a plurality of lugs 24 which are slidable on the bolts 20 so that the piston 23 rotates with the clutch plates when engaged. A helical spring 25 encircles each bolt 20 between the abutment plate 19 and the associated lug 24 and these springs act to shift the piston 23 to the release position shown in Fig. 1 when the actuating pressure is cut off.

The abutment plate 19, against which the clutch plates are engaged, includes a hub 26 that is externally journaled in a bearing 27 carried by the housing 13 and is internally splined for connection to the adjacent end of a sleeve 28 that coaxially encircles and is spaced from the input shaft 10 and connects with the load.

Pressure is established in the cylinder 22 to engage the clutch by the following instrumentalities, reference being had to Fig. 4. An oil pump 29 of characteristic type is driven by the power source and has its intake connected to a sump 30 which may be constituted by the bottom of the housing 13 while its discharge connects with the inlet side of a control valve 31. Bridged around the pump 29 is a pressure regulating valve 32 whose outlet connects with the sump 30.

The control valve 31 connects with one end of a passage 33 in the cover plate 12 (see Fig. 1) and the other end of this passage connects with a pocket 34 included in the cover plate between the adjacent end of the shaft 10 and a plate 35. Communicating with the pocket 34 is one end of a coaxial passage 36 in the shaft 10 which connects at the opposite end with a plurality of radial passages 37 whose delivery ends communicate with an annular channel 38 provided on the surface of the shaft and which constantly connects with one end of a passage 39 (see Fig. 3) provided in the hub 21 and leading to the cylinder 22.

So far as described, the clutch construction shown is intended to merely exemplify an oil operated clutch and the invention involved and subsequently described is not limited to the particular clutch design illustrated. When the control valve 31 is opened, pressure is established in the cylinder 22 to thereby shift the piston 23 to engaging position and when this valve is moved to a clutch release position, the pressure in the cylinder 22 exhausts through the passage 39, annular channel 38, passages 37, 36 and 33, the control valve 31 and a passage 40 (see Fig. 4) to the sump 30 and the springs release the clutch.

The invention consists in supplying a pumped supply of oil to and between the clutch plates during release and to maintain this supply up to a certain point as the piston 23 moves to engage the plates to thereby soften the engagement and to stop this flow after engagement to preserve pump capacity. The control of the oil supply to the clutch plates is responsive to a predetermined pressure in the cylinder 22, that is, the supply is interrupted when this pressure is reached.

Again referring to Fig. 1 and at a different radial section of the shaft 10 and hub 21 from that shown in Fig. 3, the hub includes an elongated cavity 41 which is parallel to the axis of the shaft 10 and extends for a predetermined distance from that end face of the hub 21 which is spaced from the annulus 14 towards the opposite end of the hub where it is closed. Slidable in the cavity 41 is a piston valve 42 which is biased to contact the closed end of the cavity in the clutch release position shown in Fig. 1 by a spring 43 which is held in position by a plug 44 threaded in the open end of the cavity and having an axial passage 45 extending therethrough. The piston valve 42 includes adjacent the spring engaged end thereof a transverse passage 46 that communicates with an axial passage 47 in the valve and the latter passage connects with the cavity 41 in the region of the spring 43.

The valve cavity 41 is intersected by a passage 48 in the hub 21 which connects the channel 38 with the cylinder 22 in the position of parts shown in Fig. 1, i. e., the retracted position of the piston valve 42 enables its transverse passage 46 to connect the portions of the passage 48 on opposite sides of the cavity 41. A passage 49 also connects the cylinder 22 with the closed end of the cavity 41 so that pressure in the cylinder 22 may be effected against the adjacent end 42ᵃ of the piston valve 42 to actuate the same under conditions presently outlined.

From the foregoing, it will be understood that, when the clutch is released and the engine idling, the oil delivered to the passage 48 flows into the cylinder 22 and also into the passage 49, but its pressure is then insufficient to shift the clutch piston 23 or the piston valve 42, being of the order of 2 to 6 p. s. i. The oil is also free to flow through the passages 46 and 47 in the piston valve and thence through the plug 44 into an annular pocket 50 included between the annulus 14 and an annular collecting ring 51 spaced therefrom and extending inwardly from the peripheral portion of the annulus. From the pocket 50, the oil flows into a plurality of chambers 52 provided in and circumferentially spaced around the annulus longitudinally and adjacent the periphery thereof. Each chamber 52 is closed at the end opposite to the pocket 50 and communicates through a plurality of radial passages 53 with the periphery of the annulus 14 which lies close to the inner edges of the clutch plates 15 and 16. The discharge through the passages 53 is effected by a centrifugal pumping action due to the rotation of the annulus 14 and this action is increased as the clutch approaches engagement due to the speed up of the engine.

The internal constructions of the control valve 31 and pressure regulating valve 32 are such that when the former valve occupies a position determining release of the clutch, some oil at the indicated pressure flows through the above noted subassembly, including the piston valve 42 and which is collectively denoted by the numeral 54 in Fig. 4, to cool and lubricate the clutch plates. Oil also flows at the indicated low pressure through the passage 39 into the cylinder 22. The conjunctive action of control and pressure regulating valves of this general type which provide for a full flow in one position and a relatively bleeding flow in another are well known in the art, and their systemic relation to the clutch is diagrammatically shown in Fig. 4. Specific examples of such valves are shown in U. S. Letters Patent No. 2,464,538, dated March 15, 1949, for use with a pair of clutches and as duplicated in Figs. 5 to 8 hereof for the single clutch shown.

When the control valve 31 is moved to full open position, pressure in the cylinder 22 begins rising as oil is supplied through the passages 39 and 48 and flow of oil through the plug 44 and thence to and between the clutch plates is accelerated. The piston 23 begins moving towards the fully engaged position, but the piston valve 42 remains substantially in the position shown in Fig. 1 until the opposing pressure of the clutch release springs has been overcome and the clearance between the clutch plates 15 and 16 has been taken up, since the pressure acting against the right end of the piston valve is insufficient to shift the latter towards the left or to a position closing the passage 48, thus insuring continued oil flow to these plates. The sudden rise in pressure in the cylinder 22 then is sufficient in relation to the relief afforded by the plug 44 to unbalance the pressure acting against opposite ends of the piston valve, the higher pressure acting against the right end of this valve, so that the valve is shifted to a position closing the passage 48 and the oil supply to the plates is cut off: The pressure in the cylinder 22 then may be of the order of 110 p. s. i. This arrangement insures an ample supply of oil to the clutch plates before and during engagement to substantially soften the same and also insures the full regulated capacity of the pump to maintain engagement.

For a detailed structural description of the pressure regulating valve 32 and control valve 31, reference may be had to the above noted patent. Only so much of these valves will be referred to as is necessary to an understanding of the overall operation.

All pressure regulation is achieved by the valve 32 (see Figs. 5 and 6), the springs 55 and 56 determining the relatively high and low pressures in the clutch cylinder 22, assumed to be 110 p. s. i. and 2 to 6 p. s. i., all respectively. When the engine begins idling, pressure oil from the pump 29 enters the port 57 (see Fig. 6) in the casing of the regulating valve 32 and since the piston valve 58 which is loaded by the spring 55 is then in the closed position shown in Fig. 5, the oil exists from the regulating valve 32 through the port 58′ and is delivered to the reduced passage 59 which communicates with the bore 60 of the control valve 31 between the spaced shoulders 61–61 provided on the shiftable valve stem 62, the control valve 31 then being in the clutch release position shown in Fig. 7. In this position, the right shoulder 61 masks the left half of the entrance to the passage 63 which connects with the passage 33 (see Fig. 1) leading to the clutch cylinder 22.

Pressure therefore begins building up on the head of the piston valve 58 and when it exceeds the loading of the spring 55, the valve 58 opens to bleed the oil to the chambers 64–64 and thence through the passages 65–65 to the irregular shaped passages 66–66 which connect with the bore 60 to the left of the left shoulder 61. Adjacent the latter, the oil flows through a passage 67 to an axial passage 68 in the valve stem 62 to the open right end thereof, the passage 68 being closed at the opposite end, and thence along the sides of the valve stem 62, which is oppositely flattened at 69–69 for this purpose, to the right half of the inlet to the passage 63 which is unmasked by the right shoulder 61. The pressure of this oil is determined by the piston valve 70 which is loaded by the spring 56 and when this pressure exceeds the loading of this spring, 2 to 6 p. s. i., the valve 70 opens and discharges through the passage 40 (see Fig. 4) to the sump and so establishes the indicated relatively low pressure in the clutch cylinder 22 when the clutch is released.

In connection with the foregoing, it will be understood that the face 71 of the regulating valve 32 is normally placed in abutting relation to the face 72 of the control valve 31 to register the indicated passages.

To engage the clutch, the valve stem 62 is shifted to the right to a position wherein the right shoulder 61 masks the right half of the passage 63 and so deny flow of oil theretofore regulated by the piston valve 70. At the same time, the left half of the passage 63 is unmasked so that oil flowing between the shoulders 61–61 to the cylinder 22 as aforesaid is regulated to the relatively high pressure of 110 p. s. i. by the spring 55.

I claim:

1. An oil pressure actuated clutch comprising a plurality of annular friction plates movable between released and engaged positions, a cylinder, a piston shiftable in the cylinder to engage the plates, means for continuously supplying oil under relatively low and high pressures to the cylinder in the released and engaged positions respectively of the piston, means for conducting a portion of the pressure oil to the inner edges of the friction plates when out of contact for flow between the respective opposed surfaces thereof, and means responsive to a predetermined oil pressure in the cylinder acting to shift the piston to engaged position for interrupting flow through the conducting means.

2. An oil pressure actuated clutch comprising a plurality of annular friction plates movable between released and engaged positions, a cylinder, a piston shiftable in the cylinder to engage the plates, means for continuously supplying oil under relatively low and high pressures to the cylinder in the released and engaged positions respectively of the piston, means communicating wtih the cylinder for conducting pressure oil to the inner edges of the friction plates when out of contact for flow between the respective opposed surfaces thereof, and means responsive to a predetermined oil pressure in the cylinder acting to shift the piston to engaged position for interrupting flow through the conducting means.

3. An oil pressure actuated clutch comprising a plurality of annular friction plates movable between released and engaged positions, a cylinder, a piston shiftable in the cylinder to engage the plates, means for continuously supplying oil under relatively low and high pressures to the cylinder in the released and engaged positions respectively of the piston, passage means interposed between the supply means and cylinder for conducting pressure oil directly from the supply to inner edges of the plates, when out of contact, a piston valve slidable in and movable between positions opening and closing the passage means, and means responsive to a predetermined oil pressure in the cylinder for shifting the piston valve to a position closing the passage means.

4. An oil pressure actuated clutch comprising a plurality of annular friction plates movable between released and engaged positions, a cylinder, a piston shiftable in the cylinder to engage the plates, means for supplying oil under pressure to the cylinder to actuate the piston, passage means interposed between the supply means and cylinder for conducting pressure oil to the plates, a piston valve slidable in the passage means, spring means biasing the piston valve to a position opening the passage means and means responsive to a predetermined pressure in the cylinder for shifting the piston valve to a position closing the passage means.

5. An oil pressure actuated clutch comprising a plurality of annular friction plates movable between released and engaged positions, an annular cylinder, an annular piston shiftable in the cylinder to engage the plates, passage means for continuously supplying oil under relatively low and high pressures to the cylinder in the released and engaged positions respectively of the piston, other passage means communicating with the cylinder and the first named passage means and partly included in the cylinder for conducting a portion of the pressure oil to the inner edges of the friction plates when out of contact for flow between the respective opposed surfaces thereof, and means responsive to a predetermined oil pressure in the cylinder acting to move the piston to engaged position for interrupting flow through the other passage means.

6. An oil pressure actuated clutch comprising a plurality of annular friction plates movable between released and engaged positions, an annular cylinder, an annular piston shiftable in the cylinder to engage the plates, passage means for continuously supplying oil under relatively low and high pressures to the cylinder in the released and engaged positions respectively of the piston, other passage means communicating with the cylinder and the first named passage means and partly included in the cylinder for conducting a portion of the pressure oil to the inner edges of the friction plates when out of contact for flow between the respective opposed surfaces thereof, a piston valve slidable in and movable between positions opening and closing the other passage means, and means constituting a part of the piston valve exposed and responsive to a predetermined oil pressure in the cylinder acting to move the piston to engaged position for shifting the piston valve to a closing position.

7. An oil pressure actuated clutch comprising an input shaft having a peripherally toothed annulus, an output member, a plurality of annular friction plates encircling the annulus, alternate plates having axially slidable engagement with the annulus periphery and intervening plates being arranged for like engagement with the output member, a plurality of oil collecting chambers spaced around the annulus, the annulus having a plurality of radial passages communicating the chambers with the periphery of the annulus and the inner edges of the friction plates, an annular cylinder, an annular piston shiftable in the cylinder to engage the plates, passage means for continuously supplying oil under relatively low and high pressures to the cylinder in the released and engaged positions respectively of the piston, other passage means in and communicating with the cylinder and the first named passage means and positioned to discharge oil to the chambers, and means responsive to a predetermined oil pressure in the cylinder acting to move the piston to engaged position for interrupting flow through the other passage means.

8. An oil pressure actuated clutch comprising an input shaft having a peripherally toothed annulus, an output member, a plurality of annular friction plates encircling the annulus, alternate plates having axially slidable engagement with the annulus periphery and intervening plates being arranged for like engagement with the output member, a plurality of oil collecting chambers spaced around the annulus, the annulus having a plurality of radial passages communicating the chambers with the periphery of the annulus and the inner edges of the friction plates, an annular cylinder, an annular piston shiftable in the cylinder to engage the plates, passage means for continuously supplying oil under relatively low and high pressures to the cylinder in the released and engaged positions respectively of the piston, other passage means in and communicating with the cylinder and the first named passage means and positioned to discharge oil to the chambers, a piston valve slidable in and movable between positions opening and closing the other passage means, and means constituting a part of the piston valve exposed and responsive to a predetermined oil pressure in the cylinder acting to move the piston to engaged position for shifting the piston valve to a closing position.

References Cited in the file of this patent

UNITED STATES PATENTS 1,934,850    Fromaget    Nov. 14, 1933

(Other references on following page)

UNITED STATES PATENTS

| | | |
|---|---|---|
| 2,150,950 | Thoma | Mar. 21, 1939 |
| 2,328,092 | Nutt et al. | Aug. 31, 1943 |
| 2,386,220 | Lawler et al. | Oct. 9, 1945 |
| 2,495,988 | Sheppard | Jan. 31, 1950 |
| 2,583,919 | Wilson | Jan. 29, 1952 |
| 2,620,900 | DuRostu | Dec. 9, 1952 |
| 2,632,544 | Hockert | Mar. 24, 1953 |
| 2,642,844 | Flinn | June 23, 1953 |
| 2,642,971 | Hagenbook | June 23, 1953 |
| 2,670,828 | McFarland | Mar. 2, 1954 |
| 2,702,618 | Baker | Feb. 22, 1955 |
| 2,740,512 | Fischer | Apr. 3, 1956 |
| 2,755,903 | McAninch | July 24, 1956 |